Oct. 13, 1970     M. R. ARMSTRONG ET AL     3,534,082
PRODUCTION OF BIS(2-HYDROXYETHYL)TEREPHTHALATE
THROUGH ESTER INTERCHANGE
Filed Dec. 22, 1965
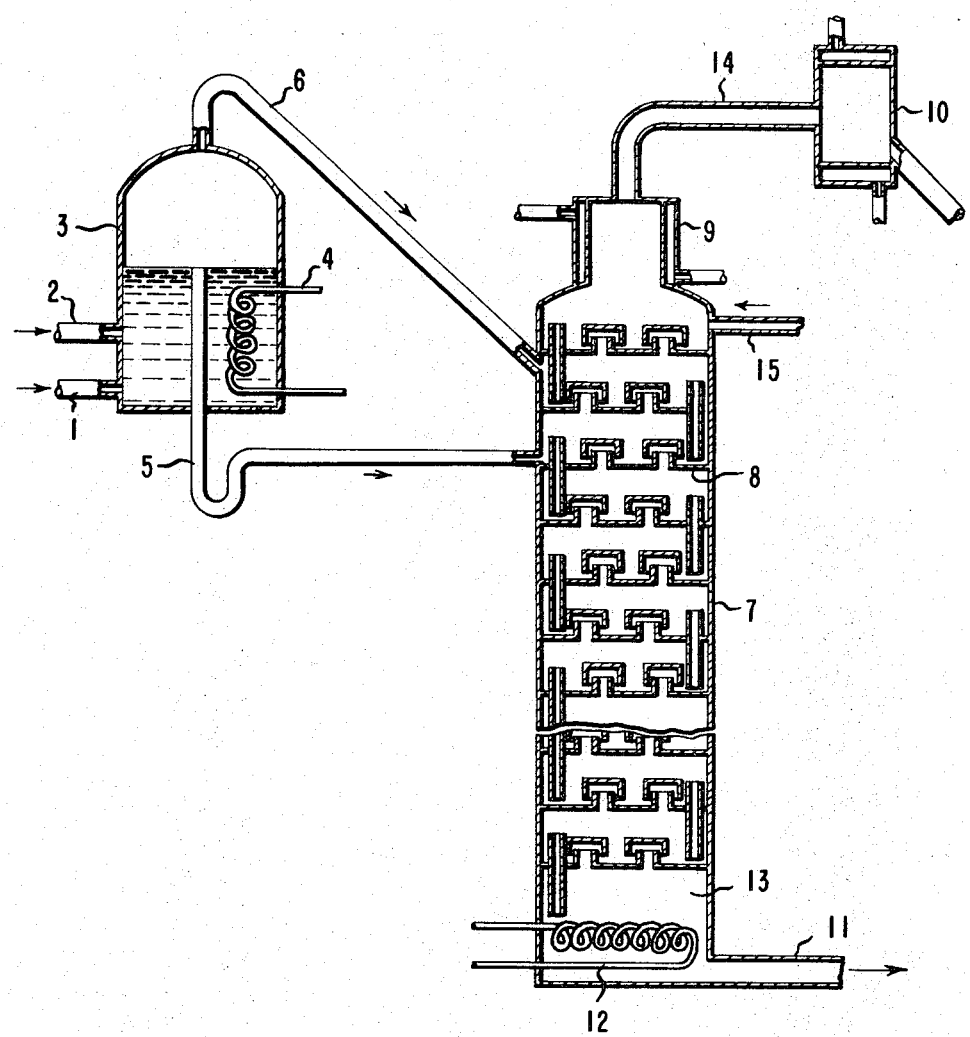
INVENTORS
MAURICE R. ARMSTRONG
JESUS C. BUSOT
BY *Norris E. Ruckman*
ATTORNEY

United States Patent Office 3,534,082
Patented Oct. 13, 1970

3,534,082
PRODUCTION OF BIS(2 - HYDROXYETHYL) TEREPHTHALATE THROUGH ESTER INTERCHANGE
Maurice R. Armstrong, Goodlettsville, Tenn., and Jesus C. Busot, Kinston, N.C., assignors to E. I. du Pont de Nemours and Company, Wilmington, Del., a corporation of Delaware
Filed Dec. 22, 1965, Ser. No. 515,568
Int. Cl. C07c 69/82
U.S. Cl. 260—475                    1 Claim

ABSTRACT OF THE DISCLOSURE

An improvement is illustrated in the continuous production of bis (2-hydroxyethyl)terephthalate in a bubble cap reaction column. The performance of the column is markedly improved when dimethyl terephthalate is partially reacted with ethylene glycol in a separate vessel and the reaction is then completed in the column. Reaction conditions are used in the vessel which are more favorable to the initial reaction than those required for completing the reaction in the column.

---

This invention relates to an ester interchange reaction between a glycol and a dialkyl ester of a dicarboxylic acid. More particularly, it relates to an improved continuous process for carrying out an ester interchange reaction to produce a bis-glycol ester of a dicarboxylic acid which is suitable for polymerization to high quality fiber-forming polyesters.

The production of the novel class of fiber-forming linear polyesters of terephthalic acid and a glycol of the series $HO(CH_2)_nOH$ wherein $n$ is an integer from 2 to 10, inclusive, is described in U.S. Pat. No. 2,465,319 to Whinfield and Dickson. The patent teaches that a preferred preparative procedure involves an ester interchange reaction between glycol and dimethyl terephthalate to form the bis-glycol-terephthalate monomer, which is then polymerized to high molecular weight terephthalate polyester under reduced pressure and at an elevated temperature.

A highly advantageous method for carrying out the ester interchange reaction on a commercial scale in a continuous manner is described by Vodonik in U.S. Pat. No. 2,829,153. In Vodonik's procedure, molten dimethyl terephthalate and ethylene glycol are supplied continuously to a rectification column in which the ester interchange reaction takes place, with methanol being removed from the top of the column and with the monomeric product being collected and removed at the bottom of the column. The Vodonik column serves as a continuous source of good quality monomer, essentially free of unconverted dimethyl, terephthalate, which is suitable for polymerization to fiber-forming polyester having a low concentration of ether groups and being of good color. However, on a commercial scale the Vodonik exchange column, e.g., a bubble cap distillation column, is a complicated and expensive piece of apparatus which has a fairly low maximum rate of throughput. Furthermore, the steady state conditions inside the column are easily upset, making the column difficult to control, especially when any sudden change is made in the amount of the material passing through the column.

For an ester interchange reaction to give good conversion of the alcohol ester to the glycol ester, it is advantageous to use high temperatures and relatively high concentrations of glycol, but these conditions produce undesirable quantities of diethylene glycol and color-forming materials which reduce the quality of the ultimate polyester product. In the Vodonik process, the conditions must be chosen to maintain the required quality even though these are not optimum for most effective use of the column at good conversion.

The present invention provides a simple and inexpensive process for greatly increasing the throughput capacity of a rectification column used for an ester interchange reaction. In comparison with the process described in the Vodonik patent, the present invention increases the capacity of a given rectification column 30 to 100%, or more with good conversion while still producing high quality monomer, i.e., low in concentration of ether linkages and of good color. The invention also provides a marked improvement in the stability of the rectification column reaction, making the column much easier to control and allowing sudden changes in throughput without causing excessive oscillation of temperature and pressure within the column. An important feature of the invention is the provision of a process in which a large portion of the exchange reaction takes place under conditions of low temperatures and low glycol-to-acid ratio which are not conducive to the formation of ether linkages and color forming materials. Then, at the end of the reaction where help is needed to drive the reaction to completion, the temperature and glycol concentration are increased.

The objectives and advantages of the invention will become readily apparent upon consideration of the following detailed description taken in conjunction with the accompanying drawing.

The drawing is a schematic illustration of apparatus which is particularly suitable for carrying out the continuous process of the invention.

In accordance with the present invention, there is provided a continuous ester interchange process for reacting a glycol with a lower-alkyl-alcohol ester of a dicarboxylic acid in the presence of an ester interchange catalyst to give the bis-glycol ester of the acid, and low molecular weight polymer thereof, wherein the reaction is carried out in two distinct stages: In the first stage the reactants are heated together at a relatively low temperature with a low mole ratio of glycol component to acid component, and then the reaction is brought to completion in a second stage at a higher temperature with a higher mole ratio of glycol component to acid component. Preferably the mole ratio in the second stage is at least twice as high as that of the first stage. By-product alcohol vapors are removed continuously from the reaction zones as the exchange reaction proceeds.

More specifically, the invention is the improvement, in the continuous process of heating the glycol and esterified acid components in the presence of an ester interchange catalyst to form the bis-glycol ester of the dicarboxylic acid, of reacting the components to 40% to 70% of completion in a reaction vessel at 150° to 210° C. (preferably 180° to 195° C.) with the mole ratio of glycol component to acid component within the range of 0.9:1 to 2.0:1, continuously feeding the partially reacted mixture into a reaction column, continuously adding glycol to raise the mole ratio of glycol component to acid component to the higher range of 2.5:1 to 10:1 and completing the reaction at a higher temperature within the range of 205° to 260° C. Preferably the mole ratio of glycol component to acid component in the reaction column is at least twice the mole ratio in the reaction vessel.

The product, the bis-glycol ester of the dicarboxylic acid, is continuously removed from the bottom of the reaction column. The product is heated in the reboiler of the column to drive off volatile components and maintain the desired reflux ratio in the column. The reboiler temperature should not exceed 275° C. and is preferably below 240° C. The temperature should be sufficient to provide a product containing less than 1% by weight of unconverted dicarboxylate ester (acid component which has not reacted to form the product).

Preferably, the vapors from both reaction zones are combined and passed through a partial condenser which returns the glycol portion of the vapor to the second reaction zone.

The mole ratio of glycol component to acid component referred to herein is intended to means the ratio in a given zone of the total number of moles of free and/or combined glycol to the total number of moles of the complementary ester-forming component used to form monomer for polymerization to a fiber-forming linear polyester of the type

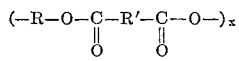

wherein R is the nucleus of the glycol component, R' is the nucleus of the acid component, and $x$ is a large integer. The total number of moles of acid component includes dicarboxylic acids and esters thereof, e.g., alcohol esters as well as the diglycol ester and the mixed glycol-alcohol ester of terephthalic acid or other dicarboxylic acid.

The invention may be more readily understood by referring to the schematic drawing of an apparatus which may be utilized in carrying out the reaction as described. In the following description the reaction between ethylene glycol and dimethyl terephthalate is used to illustrate the process of the invention.

Referring now to the figure, molten dimethyl terephthalate and ethylene glycol containing dissolved catalyst are fed continuously through tubes 1 and 2, respectively, to reaction vessel 3. The temperature of the mixture in the vessel is maintained constant by means of heating coil 4. The liquid reaction mixture overflows continuously into stand-pipe 5 while the vapors, consisting of methanol, glycol and trace amounts of dimethyl terephthalate, escape through take-off tube 6. The feed rates, temperature, and liquid volume in vessel 3 are adjusted so that the mole ratio of glycol component to terephthalate component in the vessel is maintained in the range of 0.9 to 2.0, and so that the liquid overflowing into tube 5 contains unreacted dimethyl terephthalate amounting to 30–50% of the total terephthalate content. The temperature in vessel 3 is maintained in the range of 150–205° C. In this temperature range holdup times of from 10 to 70 minutes are required to give the desired degree of reaction completion, with the lower temperatures requiring the longer holdup times.

The partially reacted liquid mixture coming through tube 5 is fed onto the top of feed plate 8 in the upper part of bubble-cap column 7. That part of the column above the feed plate is primarily a rectifying section while the part below the feed plate is both a reacting and rectifying section. In accordance with the present invention the mole ratio of glycol component to terephthalate component in the reaction section falls in the range of 2.5 to 10 and is at least twice the mole ratio of reactants existing in vessel 3.

Superimposed on the column is a partial condenser 9 to control the temperature of the vapor take-off through overhead line 14. The vapor passes into the total condenser 10, from which the condensed liquid rich in methanol proceeds to suitable receivers. The temperature of the partial condenser 9 is maintained at such a level as to give a temperature in the overhead vapor line 14 of 64–80° C. and preferably about 70° C.

In the lower section of the column a heating medium such as p-cymene or a mixture of diphenyl and diphenyl oxide is supplied to the heating coil 12 in the reboiler 13 at such a rate as to maintain the desired reflux ratio in the column. Usually the temperature of the liquid product in the reboiler is maintained within the range 205–275° C. and preferably below 240° C.

For practical reasons it is preferred that the nominal pressure inside vessels 3 and 7 be substantially atmospheric pressure. It is obvious, of course, that for column 7 to operate properly it is necessary to have a pressure drop between the bottom and top of the column.

To maintain equilibrium conditions in this continuous process the product is removed through outlet 11 at the same rate in moles per hour as dimethyl terephthalate is fed into inlet tube 1 of vessel 3. The products is considered satisfactory for polymerization into fiber-forming polyester if the concentration of unreacted dimethyl terephthalate is less than 1% of the total terephthalate content. The product is primarily the bis-glycol ester of terephthalic acid mixed with a small amount of glycol, and may contain varying quantities of low molecular weight terephthalate polyester, depending upon the specific conditions of the reaction.

The mole ratio of glycol to ester fed to vessel 3 must be somewhat higher than the mole ratio maintained inside the vessel, since some of the glycol is vaporized and removed from the reaction zone through take-off tube 6 along with methanol vapor. The feed ratio required will vary with the specific equipment design, but is easily determined. The glycol to ester molar feed ratio of 1.7 used in Example 1 will maintain a ratio of about 1.5 inside the vessel. The glycol removed as vapor through tube 6 is fed to column 7; it is condensed and flows back into the reaction zone of column 7 where it helps maintain the desired higher ratio of glycol component to acid component.

It is, of course, within the scope of the invention to supply additional fresh glycol to the column if needed to maintain the desired ratio of glycol component of terephthalic acid component. In one satisfactory arrangement, hot liquid glycol is supplied continuously in suitable quantity through tube 15 onto a plate located above tube 6. Such an arrangement helps wash down entrained dimethyl terephthalate from the upper plates and thereby helps prevent plugging of the partial condenser. In the examples below, approximately 20% of the feed glycol is supplied directly into the column.

An inspection of the figure reveals that, in comparison, with the complicated and expensive rectification column 7, reaction vessel 3 is a very simple and inexpensive piece of equipment consisting of a closed vessel with four attached tubes and a heating coil. Not even a stirring mechanism is required. To find that the capacity of reaction vessel 7 can be greatly increased by the addition of such a simple piece of apparatus as vessel 3 is indeed surprising.

The rate of the exchange reaction, which determines the required holdup times in each zone, is a function of the catalyst used in the reaction. Many suitable catalysts are available, as for example, those described in U.S. Patents Nos. 2,951,060, 2,820,023, 2,739,957, 2,662,093, 2,650,212, 2,641,592 and 2,518,283.

The invention is further illustrated but is not intended to be limited by the following examples.

EXAMPLE I

An apparatus is used of the type illustrated in the drawing. Vessel 3 is a stainless steel pot heated by means of electrical heating coils 4, with dimensions such that the liquid content is approximately 40 liters (1.4 cu. ft.). Vessel 7 is a conventional bubble-cap distillation column approximately 30 cm. (12 inches) in diameter with 20 bubble-cap plates and with the liquid level on each plate being about 4.75 cm. (1.875 inches) in depth. The liquid volume in the collecting boiler at the bottom of the column is approximately 22 liters (0.77 cu. ft.). Tube 5 feeds the product from vessel 3 onto plate number 14 of column 7 and tube 6 feeds vapors from vessel 3 into the space above plate 15.

Molten dimethyl terephthalate is fed continuously to vessel 3 through tube 1 at the rate approximately 60 kg. per hour. At the same time, ethylene glycol and catalyst are fed through tube 2 at the rate of approximately 33 kg. per hour. The catalyst composition in the glycol is equivalent to 125 parts per million manganous acetate tetrahydrate, 450 parts per million antimony oxide, and 50 parts per million sodium acetate, all calculated on the weight of dimethyl terephthalate supplied to the vessel. The mole ratio of glycol to dimethyl terephthalate fed to vessel 3 is approximately 1.7. Heat is supplied to heating coils 4 to maintain a temperature of 185° C. The mixture is stirred by the bubbling of boiling methanol released by the exchange reaction. Methanol vapors along with some glycol vapors are led through tube 6 to column 7. The liquid mixture in vessel 3 overflows into tube 5 through which it is directed to the reaction portion of column 7.

Withdrawal of samples from the liquid mixture in vessel 3 and subsequent analysis of the mixture indicates a steady-state glycol-to-terephthalate ratio of 1.63. Analysis of the liquid in tube 5 indicates that the ester interchange reaction is about 60% complete, i.e., about 60% of the methyl ester groups have been converted to glycol ester groups.

The conditions in the column are regulated to give a pressure drop from the bottom to the top of the column of 60 inches of water (112 mm. of mercury). The column is heated by coil 12 to maintain the temperature in the calandria (reboiler 13) at 230±2° C., and partial condenser 9 is adjusted to give an overhead take-off temperature of 70° C. Fresh glycol is fed to the 17th plate at the rate of 5 kg. per hour. Samples of liquid are removed from plates, 1, 5 and 13 in the column and analyzed for relative amounts of glycol and terephthalate radicals. The results are summarized in the following table wherein "molar ratio" refers to the mole ratio of glycol component to acid component as previously defined:

TABLE 1

| Plate No. | Plate temperature | Molar ratio |
| --- | --- | --- |
| 1 | 211 | 3.94 |
| 5 | 208 | 3.95 |
| 13 | 190 | 3.42 |

The product of the ester interchange reaction, which is removed through conduit 11 at the rate of 172 lbs. per hour (78 kg. per hour), is found to be of excellent color. Analysis shows the content of unconverted dimethyl terephthalate to be less than 0.5% by weight and the mole ratio of glycol component to terephthalate component to be 2.00±.05.

The product from outlet 11 of the ester interchange column is immediately passed into a continuous polymerization system in which the temperature of the mixture is raised and the pressure reduced in a series of vessels, with the final vessel having a temperature of 277° C. and a pressure of 3.0 mm. of mercury. The polyethylene terephthalate which is withdrawn continuously from the system has an intrinsic viscosity of 0.65. The color of the polymer is excellent and the content of ether groups is less than 2.5 mole percent.

EXAMPLE II

Example I is repeated in essential details but with a lower rate of throughput. Vessel 3 is supplied with molten dimethyl terephthalate at the rate of 36.5 kg. per hour and with glycol at the rate of 20 kg. per hour. The temperature and mole ratio inside vessel 3 is as in Example I. Analysis of the material removed through tube 5 indicates approximately 65% completion of the ester interchange reaction.

Calandria temperature, vapor take-off temperature, and pressure drop within column 7 are as in Example I. Fresh glycol is fed to plate 17 at the rate of 3.4 kg. per hour. Analysis of samples withdrawn from three plates of the column gives the glycol-to-terephthalate ratios shown in the following table. Plate temperatures are also shown.

TABLE 2

| Plate No. | Plate temperature | Mole ratio |
| --- | --- | --- |
| 1 | 207 | 5.60 |
| 5 | 206 | 5.40 |
| 13 | 197 | 4.94 |

Analysis of the material withdrawn from the bottom of the column shows the content of unconverted dimethyl terephthalate to be less than 0.5% and the mole ratio of glycol component to terephthalate component to be 2.00±0.05. The material is essentially free of diethylene glycol and is considered to be of excellent color.

Polymerization of the ester interchange product as in Example I to an intrinsic viscosity of 0.65 gives a polymer suitable in all respects for the preparation of textile fibers. Ether content is less than 2.5 mole percent and polymer color is excellent.

EXAMPLE III

This example illustrates the effect of sudden changes in throughput.

The apparatus described in Example I is adjusted to give a steady state condition with throughput equivalent to 70 lbs. per hour (31.6 kg. per hour) of polymer. The mole ratio of glycol to dimethyl terephthalate fed to vessel 3 is 1.7 and the temperature in vessel 3 is 180° C. Pressure drop in column 7 is maintained at 60 inches of water (112 mm. of mercury) and the calandria temperature is 230° C. After the process has come to full equilibrium and steady state conditions are fully established, a sudden change is made in throughput to a level equivalent to 150 lbs. per hour (68 kg. per hour) of polymer. This change amounts to a 114% increase in throughput. Temperatures are monitored and analyses made for unconverted dimethyl terephthalate in the product. At no time does the amount of unconverted dimethyl terephthalate rise higher than 0.8%, and when a new steady state condition is established it drops back to about 0.5%. The temperatures at various points in the column settle down to a new steady state condition within two hours from the initial change in throughput.

For comparison, column 7 is operated without the assistance of vessel 3. Molten dimethyl terephthalate is fed directly to plate 14 and liquid glycol to plate 15. Steady state conditions are established with a throughput level of 125 lbs. per hour (56.7 kg. per hour) of polymer, a pressure drop of 60 inches of water (112 mm. of mercury), and a calandria temperature of 230° C. A sudden change in throughput is then made to the level of 150 lbs. per hour (68 kg. per hour) of polymer, an increase of only 20%. Temperatures within the column are monitored and found to require more than 2.5 hours to arrive at a new steady state condition, a longer time than was required to recover from the much larger throughput change described in the first part of this example. Analysis of the product after the change in throughput shows a concentration of unconverted dimethyl terephthalate above 1% by weight, which is unsatisfactory for the preparation of fiber-forming polymer.

The above results show the tremendous advantage in the use of auxiliary vessel 3 in accordance with this invention in providing an ester interchange process which is more adaptable to sudden changes in throughput than those dependent upon operation of a rectification column alone.

EXAMPLE IV

This example illustrates the increased throughput capacity provided by the process of this invention.

The apparatus described in Example I is operated with essentially the same feed ratio, temperature and pressure conditions described in Example I with the exception that the throughput is increased in stages in an attempt to reach the maximum throughput capacity. The limit sought is that point at which the concentration of unconverted dimethyl terephthalate in the product withdrawn from outlet 11 of the column exceeds 1.0% by weight. Throughput is increased to a level equivalent to 175 lbs. per hour (79 kg. per hour) of polymer which, in this experiment, is found to be the capacity limit of the metering pump used to maintain a constant flow of product from outlet 11 of the column. At this rate of throughput the amount of unconverted dimethyl terephthalate in the product is found to be less than 0.6%, which indicates that the capacity of the reaction system is considerably above 175 lbs. per hour.

For comparison, vessel 3 is disconnected from column 7 and molten dimethyl terephthalate is fed directly to plate 14 and liquid glycol to plate 15 of the column in the same mole ratio used above. The essential operating conditions used above are retained, i.e., a pressure drop in the column of 60 inches of water (112 mm. of mercury) and a calandria temperature of 230° C. By increasing the throughput rate in stages it is found that when the rate is equivalent to 125 lbs. per hour (57 kg. per hour) of polymer, the concentration of unconverted dimethyl terephthalate in the product removed from column 7 is just about 1.0%. Higher rates of throughput give more than 1% unconverted dimethyl terephthalate in the product. This comparative example, therefore, illustrates that the process of the present invention provides an increase in throughput capacity of at least 30% over that of a rectification column used in conventional manner.

EXAMPLE V

This example illustrates the effect of temperature and holdup time on the percent conversion attained in the first stage of the process of this invention. The results indicate the flexibility of the process in providing a suitable reactant supply from vessel 3, or the like, for rectification column 7.

Ethylene glycol and molten dimethyl terephthalate are fed to vessel 3 of the drawing at rates which provide a mole ratio of 1.6. The catalyst used is the same as that described in Example I. The throughput rate and the temperature within the vessel are varied and the percent conversion of dimethyl terephthalate is calculated for each steady state condition. In the following table, throughput is given in terms of weight of dimethyl terephthalate per hour supplied to the vessel. Holdup time is calculated from the capacity of the vessel, which is approximately 38 kg. Percent conversion is calculated from the methanol evolved from the reaction mixture and the results are presented in terms of the percentage of the total methyl ester groups which are converted to glycol ester groups. The data in the table indicate the flexibility in choice of process conditions which may be used to provide feed material for the second stage of the process of this invention.

TABLE 3

| Throughput, lbs./hr. | Throughput, kg./hr. | Holdup time, min. | Temp., ° C. | Percent conversion |
|---|---|---|---|---|
| 70 | 32 | 52 | 180 | 48 |
| 70 | 32 | 52 | 190 | 55 |
| 70 | 32 | 52 | 205 | 69 |
| 100 | 45 | 36 | 190 | 54 |
| 150 | 68 | 25 | 190 | 52 |
| 160 | 73 | 22 | 185 | 46 |
| 175 | 80 | 20 | 185 | 44 |

Although the invention has been illustrated with the ester interchange reaction between ethylene glycol and dimethyl terephthalate, the principles of the invention may be applied to the reaction between other glycols and other lower alkyl esters of dicarboxylic acids. Mixtures of different glycols as well as mixtures of different lower alkyl esters of dicarboxylic acids may be used.

Since many different embodiments of the invention may be made without departing from the spirit and scope thereof, it is to be understood that the invention is not limited by the specific illustrations except to the extent defined in the following claim.

What is claimed is:

1. In the continuous process of heating ethylene glycol with dimethyl terephthalate in the presence of an ester-interchange catalyst, using an over-all feed rate of about 2 moles of glycol per mole of dimethyl terephthalate to form bis-glycol terephthalate ester; the improvement of feeding the dimethyl terephthalate, ethylene glycol and catalyst into a reaction vessel maintained at about 185° C., the mole ratio of ethylene glycol to dimethyl terephthalate in the feed to the vessel being approximately 1.7, partially reacting the dimethyl terephthalate until about 60% of the methyl ester groups have been replaced with glycol ester groups, continuously feeding the partially reacted mixture and ethylene glycol into a rectification column, and completing the reaction in the column at mole ratios of total free and combined glycol to total esterified terephthalic acid within the range of 3.4 to 4 and at higher temperatures within the range of 190° to 230° C. to provide a product containing less than 0.6% by weight of unconverted dimethyl terephthalate.

References Cited

UNITED STATES PATENTS

| 2,829,153 | 4/1958 | Vodonik | 260—475 |
| 2,973,341 | 2/1961 | Hippe et al. | 260—75 |
| 2,905,707 | 9/1959 | Hurt et al. | 260—475 |

FOREIGN PATENTS

| 970,468 | 9/1964 | Great Britain. |

JAMES A. PATTEN, Primary Examiner

E. J. SKELLY, Assistant Examiner

U.S. Cl. X.R.

260—75